(12) United States Patent
Liang et al.

(10) Patent No.: US 10,356,707 B2
(45) Date of Patent: Jul. 16, 2019

(54) WIRELESS LOCAL AREA NETWORK CONNECTION METHOD, MOBILE TERMINAL, AND STORAGE MEDIUM

(71) Applicant: Tencent Technology (Shenzhen) Company Limited, Shenzhen (CN)

(72) Inventors: Hanyun Liang, Shenzhen (CN); Haifeng Ding, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/013,785

(22) Filed: Jun. 20, 2018

(65) Prior Publication Data

US 2018/0302852 A1    Oct. 18, 2018

Related U.S. Application Data

(63) Continuation-in-part of application No. PCT/CN2017/984878, filed on Jul. 28, 2017.

(30) Foreign Application Priority Data

Jul. 29, 2016    (CN) .......................... 2016 1 0616199

(51) Int. Cl.
*H04W 12/04*    (2009.01)
*H04W 12/06*    (2009.01)
(Continued)

(52) U.S. Cl.
CPC ........... *H04W 48/18* (2013.01); *H04L 63/107* (2013.01); *H04W 12/04* (2013.01); *H04W 12/06* (2013.01);
(Continued)

(58) Field of Classification Search
CPC ..... H04W 84/12; H04W 48/16; H04W 48/20; H04W 12/06; H04W 48/10
See application file for complete search history.

(56) References Cited

U.S. PATENT DOCUMENTS

2009/0061870 A1*  3/2009  Finkelstein ........... H04W 48/20
                                                      455/435.2
2009/0109941 A1*  4/2009  Carter ..................... H04W 8/18
                                                      370/338
(Continued)

FOREIGN PATENT DOCUMENTS

CN    103024929 A    4/2013
CN    105472703 A    4/2016
CN    106488529 A    3/2017

OTHER PUBLICATIONS

Tencent Technology, ISRWO, PCT/CN2017/094878, Oct. 30, 2017, 8 pgs.

(Continued)

*Primary Examiner* — Nam T Huynh
(74) *Attorney, Agent, or Firm* — Morgan, Lewis & Bockius LLP

(57) ABSTRACT

The various embodiments described herein include methods, devices, and systems for connecting to a wireless local area network. In one aspect, a method is performed at a mobile terminal. The terminal detects wireless local area networks near a geographic location where the terminal is located, each of the wireless local area networks includes an identifier. The terminal then matches the identifiers of the wireless local area networks and a prestored geographic location of the terminal with an identifier and a geographic location of a wireless local area network, and determines an accessible wireless local area network that includes a corresponding access key. The terminal sets the corresponding access key. The terminal presents a list of the wireless local area networks on a network connection interface, and a connection identifier for the accessible wireless local area network. The terminal detects an operation on the connection identifier, and connects to the accessible wireless local area network.

14 Claims, 10 Drawing Sheets

(51) Int. Cl.
*H04W 12/08* (2009.01)
*H04W 36/00* (2009.01)
*H04W 48/16* (2009.01)
*H04W 48/18* (2009.01)
*H04W 64/00* (2009.01)
*H04L 29/06* (2006.01)
*H04W 84/12* (2009.01)

(52) U.S. Cl.
CPC ....... *H04W 12/08* (2013.01); *H04W 36/0022* (2013.01); *H04W 48/16* (2013.01); *H04W 64/00* (2013.01); *H04L 63/083* (2013.01); *H04W 84/12* (2013.01)

(56) References Cited

U.S. PATENT DOCUMENTS

2014/0073289 A1 3/2014 Velasco
2018/0262982 A1* 9/2018 Yu ........................ H04W 48/16

OTHER PUBLICATIONS

Tencent Technology, IPRP, PCT/CN2017/094878, Jan. 29, 2019, 7 pgs.

* cited by examiner

WIRELESS LOCAL AREA NETWORK CONNECTION METHOD, MOBILE TERMINAL, AND STORAGE MEDIUM

RELATED APPLICATIONS

This application is a continuation-in-part application of PCT Application No. PCT/CN2017/094878, entitled "WIRELESS LOCAL AREA NETWORK CONNECTING METHOD, MOBILE TERMINAL AND STORAGE MEDIUM," filed on Jul. 28, 2017, which claims priority to Chinese Patent Application No. 201610616199.X, entitled "WIRELESS LOCAL AREA NETWORK CONNECTING METHOD, MOBILE TERMINAL AND STORAGE MEDIUM," filed on Jul. 29, 2016, all of which are incorporated herein by reference in their entirety.

FIELD OF THE TECHNOLOGY

The present application relates to technologies of wireless local area network communication, and in particular, to a wireless local area network connection method, a mobile terminal, and a storage medium.

BACKGROUND OF THE DISCLOSURE

With the popularity and development of various mobile terminals such as smartphones, tablet computers, in-vehicle mobile terminals, and wearable devices and requirements of users on obtaining information anytime anywhere, the users need to access the Internet anytime anywhere for data communication.

Cellular data communication such as 4G communication has a faster data transmission speed than usual (e.g., about 10 times faster than 3G networks). However, for requirements of saving costs (e.g., cellular device charges) and using a faster transmission speed, the users tend to perform data communication by accessing mobile terminals to wireless local area networks (WLAN). Typically, the wireless local area networks use a wireless fidelity (WiFi) protocol network.

Currently, the wireless local area networks are widely deployed in various public places such as metros and shops. This brings convenience to the requirements on data communication of the users anytime anywhere. However, the wireless local area networks deployed in public places are usually not open, that is, have authentication mechanisms (e.g., requires a password to access). A user needs to pre-obtain access keys of the wireless local area networks before he or she can access (i.e., connect to) the local area network. When the user moves to a different area (e.g., a different geographical area) that is covered other wireless local area networks, resetting (e.g., connecting to a different network) is required. Furthermore, a user who has previously accessed a wireless local area network may find that he is no longer able to connect to the same wireless local area network because the access key (i.e., password) has been updated over time.

Related technologies do not provide an effective solution for implementing automatic access of the mobile terminals to the wireless local area networks and seamless handover of access.

SUMMARY

Embodiments of the present application provide a wireless local area network connection method and a mobile terminal, so as to support the mobile terminal to be automatically accessed (e.g., connected) to the wireless local area network and implement seamless handover of access.

Technical solutions of the embodiments of this application are implemented in this way:

According to a first aspect, an embodiment of the present application provides a method of connecting to a wireless local area network performed at a mobile terminal, the method including:

detecting wireless local area networks covering the mobile terminal, wherein each of the wireless local area networks includes an identifier;

matching the identifiers of the wireless local area networks and a current geographic location of the mobile terminal with an identifier and a geographic location of a wireless local area network storing a network access key, and determining an accessible wireless local area network in the wireless local area networks covering the mobile terminal, the accessible wireless local area network having a corresponding access key;

setting the corresponding access key for the accessible wireless local area network on the mobile terminal;

presenting, in an application, a list of the wireless local area networks covering the mobile terminal on a network connection interface, and presenting a connection identifier for the accessible wireless local area network; and detecting an operation on the connection identifier of the accessible wireless local area network, and connecting to the accessible wireless local area network based on the access key of the accessible wireless local area network.

According to a second aspect, an embodiment of the present application provides a mobile terminal for connecting to a wireless local area network, the mobile terminal comprising one or more processors, memory, and a plurality of program modules stored in the memory and configured for execution by the one or more processors, wherein the plurality of program modules include:

a detection unit, configured to detect wireless local area networks covering the mobile terminal, wherein each of the wireless local area networks includes an identifier;

a matching unit, configured to: match the identifiers of the wireless local area networks and a current geographic location of the mobile terminal with an identifier and a geographic location of a wireless local area network storing a network access key, and determine an accessible wireless local area network in the wireless local area networks covering the mobile terminal, the accessible wireless local area network having a corresponding access key;

a setting unit, configured to set the corresponding access key for the accessible wireless local area network on the mobile terminal;

a presenting unit, configured to: present, in an application, a list of the wireless local area networks covering the mobile terminal on a network connection interface, and present a connection identifier for the accessible wireless local area network; and an accessing unit, configured to: detect an operation on the connection identifier of the accessible wireless local area network, and perform access based on the access key of the accessible wireless local area network.

According to a third aspect, an embodiment of the present application provides a non-transitory computer readable storage medium storing a plurality of computer executable instructions, including instructions for connecting to a wireless local area network, which when executed by a mobile terminal having memory and one or more processors, cause the mobile terminal to:

detect wireless local area networks covering a mobile terminal, wherein each of the wireless local area networks includes an identifier;

correspondingly match the identifiers of the wireless local area networks and a current geographic location of the mobile terminal with an identifier and a geographic location of a wireless local area network storing a network access key, and determine an accessible wireless local area network in the wireless local area networks covering the mobile terminal, the accessible wireless local area network having a corresponding access key;

set the corresponding access key for the accessible wireless local area network on the mobile terminal;

present, in an application, a list of the wireless local area networks covering the mobile terminal on a network connection interface, and present a connection identifier for the accessible wireless local area network; and detect an operation on the connection identifier of a target accessible wireless local area network, and connect to the accessible wireless local area network based on the access key of the accessible wireless local area network.

The embodiments of the present application have the following beneficial effects: prestored related information of the wireless local area networks are matched with the geographic location of the mobile terminal, so as to efficiently search for the accessible wireless local area network and the corresponding access key. The connection identifier supports a user to connect to the wireless local area networks through a click and does not require an extra operation, thereby improving efficiency of access to the wireless local area network. When the wireless local area networks covering the mobile terminal are handed over, the mobile terminal can be accessed as long as a new wireless local area network is connected by using the connection identifier, thereby implementing seamless handover of access.

BRIEF DESCRIPTION OF THE DRAWINGS

FIG. 4-1 to FIG. 4-3 are operation schematic diagrams of a connection to a wireless local area network, in accordance with some embodiments of the present application;

DESCRIPTION OF EMBODIMENTS

The present application is further described in detail below with reference to the accompanying drawings and embodiments. It should be understood that the embodiments described herein are merely used for explaining the present application but are not intended to limit the present application. In addition, the following provided embodiments are some embodiments for implementing the present application, and not all embodiments for implementing the present application are provided. In the case of no conflict, the technical solutions disclosed in the embodiments of the present application can be implemented in any combination.

Nouns and terms involved in the embodiments of the present application are applicable to the following explanations.

A mobile terminal is a mobile terminal device of any type such as a smartphone, a tablet computer, and an in-vehicle mobile terminal or a mobile terminal device that is frequently used. In some embodiments, the mobile terminal includes a display. The mobile terminal has near field communication capability. In some embodiments, the mobile terminal includes cellular communication capability. In some embodiments, the mobile terminal also includes local area network (e.g., wireless) communication capability.

An identifier of a wireless local area network includes:

1) a service set identifier (SSID) of the wireless local area network; and 2) a basic service set identifier (BSSID) of the wireless local area network, where a wireless local area network includes at least an access point (AP) connected to a wired network and several wireless workstations, and such a configuration is referred to as a basic service set (BSS). A group of mobile terminals set the same BSS name, that is, can automatically form a group, and the BSS name is the BSSID.

Usually, in a WLAN joined by a mobile terminal such as a mobile phone, the BSSID can be regarded as a medium access control (MAC) address of an AP.

The embodiments of the present application may be provided as a wireless local area network connection method and a mobile terminal to which the wireless local area network connection method is applied. The mobile terminal may be implemented in any manner, for example, may be implemented in a manner such as a smartphone, a tablet computer, a laptop computer, and an in-vehicle mobile terminal, or certainly may be implemented in a desktop computer or a similar computing device.

Figure 1:
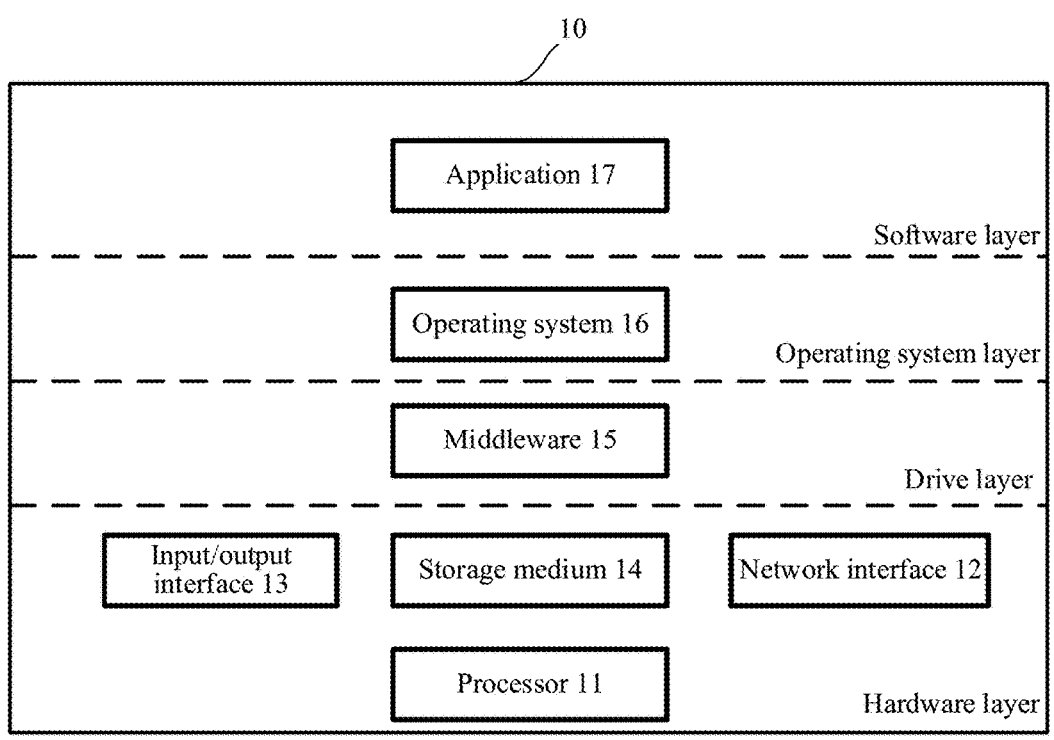
FIG. 1 is a schematic structural diagram of a mobile terminal, in accordance with some embodiments of the present application.

In addition, the embodiments of the present application do not limit software and hardware structures of the mobile terminal. In accordance with some embodiments, a schematic structural diagram of a mobile terminal 10 is shown in FIG. 1, the mobile terminal 10 includes a hardware layer, a drive layer, an operating system layer, and a software layer. In some embodiments, each of the layers includes respective components and/or modules. However, a person skilled in the art should understand that the structure of the mobile terminal 10 shown in FIG. 1 is only an example and does not compose a limitation on the structure of the mobile terminal. For example, components more than those shown in FIG. 1 are set for the mobile terminal 10 according to implementation needs, or some components are omitted according to implementation needs.

The hardware layer of the mobile terminal 10 includes a processor 11, an input/output interface 13, a non-transitory storage medium 14, and a network interface 12, and components may be connected by a system bus for communication. The processor 11 may be implemented by using a central processing unit (CPU), a microcontroller unit (MCU), an application specific integrated circuit (ASIC), or a field-programmable gate array (FPGA). The input/output interface 13 may be implemented by using an input/output device such as a display screen, a touchscreen, or a speaker. The storage medium 14 may be implemented by using a non-volatile storage medium such as a flash memory, a hard disk, or an optical disc or may be implemented by using a volatile storage medium such as a double data rate (DDR) dynamic memory. For example, the storage medium 14 may be set at the same location as the mobile terminal 10, or may be set remotely or in a foreign place relative to the mobile terminal 10, or may be distributed and set locally or in a foreign place relative to the mobile terminal 10. The network interface 12 provides to the processor 11 external data such as an access capability of the storage medium 14 that is set in a foreign place. For example, the network interface 12 may perform near field communication based on a near field communication (NFC) technology, a Bluetooth technology, a ZigBee technology, and may also implement, for example, communication based on a communication standard such as a code division multiple access (CDMA) or wideband code division multiple access (WCDMA) and an evolving standard thereof.

The drive layer includes middleware 15 for an operating system 16 to identity the hardware layer and communicating with components of the hardware layer, and for example, may be a set of drive applications for components of the hardware layer.

The operating system 16 is used for providing a user-oriented graphical interface, and for example, includes various types of applications 17. The operating system 16 supports control of a user over a device through the graphical interface. The embodiments of the present application do not limit a software environment of the foregoing device, for example, the type and version of an operating system. For example, the operating system may be an Android operating system, an iOS operating system, a Linux operating system, or a UNIX operating system.

Based on the structure of the mobile terminal 10 shown in FIG. 1, the wireless local area network connection method provided in the present application may be implemented by executing executable instructions in the storage medium 14 by the mobile terminal 10, and the executable instructions are used for performing the wireless local area network connection method provided in the embodiments of the present application. For example, the executable instructions may be provided as functions or applications (such as a WiFi housekeeper and connecting to WiFi through a click) of content of the operating system 16 of the mobile terminal 10, or may be provided as setup packages of third-party applications, or may be provided as in a form such as a function plugin of an application already installed in the operating system 16 (such as a plugin of connecting to WiFi through a click in the WiFi housekeeper application).

The following embodiments of the present application are provided based on software and hardware structures of the foregoing mobile terminal.

Figure 2:
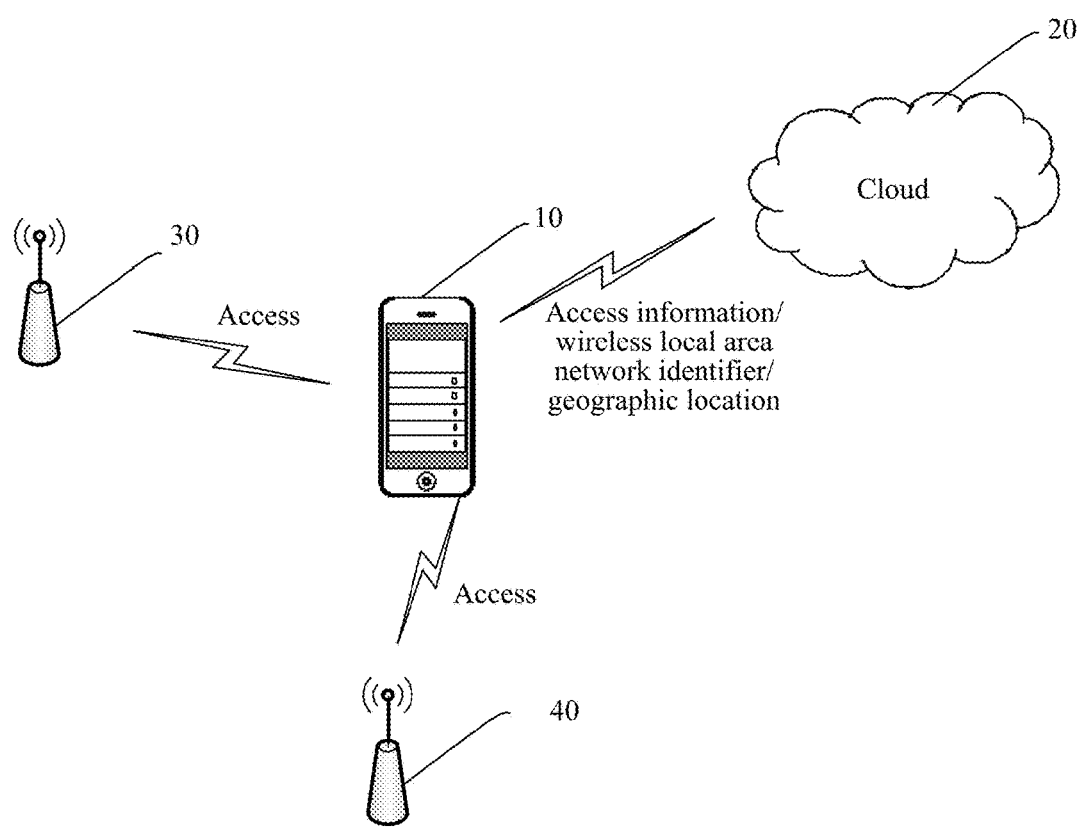
FIG. 2 is a scenario schematic diagram of a wireless local area network connection, in accordance with some embodiments of the present application.

An application scenario schematic diagram of a wireless local area network connection according to an embodiment of the present application is shown in FIG. 2. In FIG. 2, a mobile terminal 10, a wireless local area network 30, a wireless local area network 40, and a cloud 20 (e.g., a server system) are exemplarily shown. Herein, it is assumed that the mobile terminal 10 is located within a coverage range of the wireless local area network 30 and the wireless local area network 40.

Figure 3:
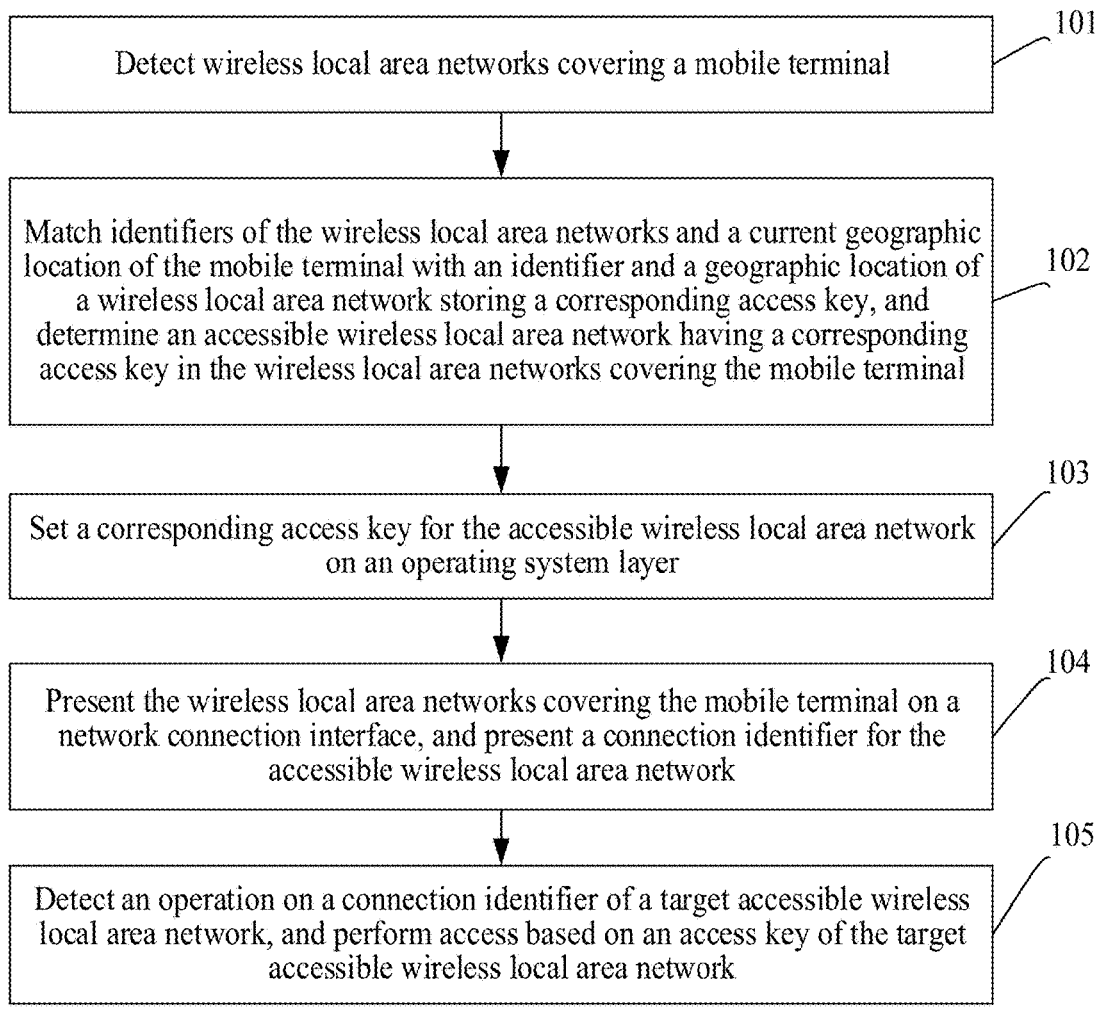
FIG. 3 is a schematic flowchart of a wireless local area network connection method, in accordance with some embodiments of the present application.

In some embodiments, descriptions are provided with reference to a schematic flowchart of a wireless local area network connection method according to an embodiment of the present application as shown in FIG. 3. The method includes the following steps:

Step 101: Detect wireless local area networks covering a mobile terminal.

In an embodiment, the mobile terminal detects a broadcasting signal of a wireless local area network in an environment in which the mobile terminal is located and parses the broadcasting signal to obtain an identifier of the corresponding wireless local area network.

Descriptions are provided by using an example that the wireless local area network connection method provided in this embodiment of the present application is performed by a particular application in the mobile terminal, such as the WiFi housekeeper. The operating system layer of the mobile terminal calls a network interface 12 (such as a WiFi module) of the hardware layer, the broadcasting signal of the wireless local area network covering the environment in which the mobile terminal is located is scanned according to an inbuilt logic, the broadcasting signal is parsed to obtain the identifier of the corresponding wireless local area network to form a WiFi list (including the identifier of the wireless local area network), so as to complete detection of the wireless local area network covering a current geographic location of the mobile terminal. The WiFi housekeeper may learn of the wireless local area network covering the mobile terminal by reading the WiFi list.

Using FIG. 3 as an example, the operating system layer of the mobile terminal 10 calls a network interface of the hardware layer to monitor the broadcasting signal in 2.4 GHz and 5 GHz channels, and SSIDs of the wireless local area network 30 and the wireless local area network 40 may be parsed from the broadcasting signal.

Because the wireless local area network covered by the current location of the mobile terminal is determined by parsing the broadcasting signal, comprehensive detection may be performed on the wireless local area network covering the mobile terminal by parsing the broadcasting signal as long as the mobile terminal is located within an effective radiation range of a wireless local area network signal.

In another embodiment, a manner of fast determining the wireless local area network in the current location of the mobile terminal without parsing the broadcasting signal is provided.

The manner is applicable to this scenario: movement that a user holds the mobile terminal is regular (for example, a fixed commute route or a fixed route for playing in a playground). Therefore, the user usually regularly uses several wireless local area networks. Once identifiers and geographic locations of these regularly used wireless local area networks are stored in the mobile terminal, which wireless local area networks a current geographic location covers may be fast determined by reading the geographic locations stored in the mobile terminal.

In addition, the manner is also applicable to this scenario: wireless local area networks deployed at some locations do not emit a broadcasting signal (that is, the SSID is not externally broadcast). In this way, even if the user is once accessed to such as "hidden" wireless local area network, when the user is within a coverage range of the wireless local area network again, such a hidden wireless local area network cannot be found by parsing the broadcasting signal.

In continuation of the foregoing descriptions, the mobile terminal prestores a geographic location of the mobile terminal and updates the geographic location when an update condition of the geographic location is satisfied, to ensure timeliness of the stored geographic location. In addition, the mobile terminal further stores an identifier and a geographic location of a wireless local area network (such as the foregoing hidden wireless local area network) having an access key. Thus, the prestored (for example, stored in a cache) geographic location of the mobile terminal in the mobile terminal is matched with the geographic location of the wireless local area network storing the corresponding access key, and if matching succeeds, it is determined that the mobile terminal is within a coverage range of a corresponding wireless local area network.

Still using FIG. 3 as an example, the mobile terminal 10 reads the prestored geographic location of the mobile terminal 10. The read geographic location of the mobile terminal 10 is regarded as a current geographic location of the mobile terminal 10, and the read geographic location is matched with the geographic location of the wireless local area network storing the corresponding access key in the mobile terminal 10. Assuming herein that the mobile terminal 10 stores identifiers of the wireless local area network 30 and the wireless local area network 40 and the geographic location, that the mobile terminal 10 is in the wireless local area network 30 and a coverage range of the wireless local area network 40 are determined.

It can be learned that by matching the geographic location of the mobile terminal (by reading the latest geographic location stored in the mobile terminal) with the geographic location of the wireless local area network storing the corresponding access key in the mobile terminal, on the premise that the broadcasting signal does not need to be received for parsing, the wireless local area network, such as a wireless local area network that is once accessed at the current geographic location, currently geographically covered by the mobile terminal can be fast positioned.

Step 102: Match identifiers of the wireless local area networks and a current geographic location of the mobile terminal with an identifier and a geographic location of a wireless local area network storing a corresponding access key, and determine an accessible wireless local area network having a corresponding access key in the wireless local area networks covering the mobile terminal.

In an embodiment, the mobile terminal prestores at least some of the following information of the wireless local area network (such as the wireless local area network covering the current geographic location of the mobile terminal): 1) the identifier of the wireless local area network, such as an SSID and a BSSID; 2) the access key (e.g., password) of the wireless local area network; and 3) the geographic location of the wireless local area network.

In an actual application, wireless local area networks at different geographic locations cannot be accurately distinguished based on only the identifiers of the wireless local area networks. For example, wireless local area networks at two different geographic locations may have the same SSID such as "free WiFi". Therefore, in the embodiments of the present application, wireless local area networks are distinguished based on geographic locations and identifiers of the wireless local area networks. Even if multiple wireless local area networks are deployed at the same geographic location, the wireless local area networks can be distinguished based on identifiers of the wireless local area networks.

In continuation of the foregoing descriptions, the mobile terminal determines the wireless local area network that can be accessed at the current geographic location of the mobile terminal (an accessible wireless local area network for short) in such a manner: correspondingly matching the identifiers of the wireless local area networks covering the mobile terminal and the prestored geographic location of the mobile terminal with the identifier and the geographic location of the wireless local area network storing the corresponding access key in the mobile terminal, determining that the wireless local area network that is successfully matched is the accessible wireless local area network, and determining the corresponding access key.

Using an example that the identifier of the wireless local area network is the SSID, by correspondingly matching the SSID of the wireless local area network and the geographic location of the mobile terminal with the SSID and the geographic location of the wireless local area network storing the corresponding access key in the mobile terminal, it is determined that the wireless local area network that is successfully matched is the accessible wireless local area network, and the corresponding access key may be determined; if no matching succeeds, the SSID and the BSSID of the wireless local area network may also be correspondingly matched with the SSID and the BSSID of the wireless local area network storing the corresponding access key in the mobile terminal; it is determined that the wireless local area network that is successfully matched is the accessible wireless local area network, and the corresponding access key may be determined.

Using FIG. 3 as an example, the mobile terminal 10 correspondingly matches the identifier of the wireless local area network 30 and the prestored geographic location of the mobile terminal 10 with the identifier and the geographic location of the wireless local area network storing the corresponding access key in the mobile terminal 10. Assuming herein that the mobile terminal 10 stores the identifiers, geographic locations, and access keys of the wireless local area network 30 and the wireless local area network 40, it can be determined that the wireless local area network 30 is the accessible wireless local area network, and similarly, it can be determined that the wireless local area network 40 is the accessible wireless local area network.

It can be learned that the mobile terminal prestores the geographic location and the identifier of the wireless local area network having the corresponding access key, and therefore, when the mobile terminal is within a coverage range of any wireless local area network, the accessible wireless network at the current geographic location and the corresponding access key may be efficiently found.

In another embodiment, the mobile terminal locally stores identifiers and geographic locations of a small number of wireless local area networks having corresponding access keys. Consequently, when the location of the mobile terminal changes quite randomly, based on that the mobile terminal locally stores the identifier and the geographic location of the wireless local area network having the corresponding access key, the wireless local area networks covered by all geographic locations of the mobile terminal may not be hit.

Accordingly, in some embodiments, the mobile terminal may upload identifiers, geographic locations, and access keys of wireless local area networks that it has accessed (e.g., currently and/or previously accessed) to a cloud for storage. In addition, the mobile terminal determines the wireless local area network that can be accessed at the current geographic location (an accessible wireless local area network for short) in such a manner: correspondingly matching the identifiers of the wireless local area networks covering the mobile terminal and the prestored geographic location of the mobile terminal with the identifier and the geographic location of the wireless local area network storing the corresponding access key in the mobile terminal, determining that the wireless local area network that is successfully matched is the accessible wireless local area network, and determining the corresponding access key.

Using an example that the identifier of the wireless local area network is the SSID, by correspondingly matching the SSID of the wireless local area network and the geographic location of the mobile terminal with the SSID and the geographic location of the wireless local area network storing the corresponding access key in the cloud, it is determined that the wireless local area network that is successfully matched is the accessible wireless local area network, and the corresponding access key may be determined; if no matching succeeds, the SSID and the BSSID of the wireless local area network may also be correspondingly matched with the SSID and the BSSID of the wireless local area network storing the corresponding access key in the cloud; it is determined that the wireless local area network that is successfully matched is the accessible wireless local area network, and the corresponding access key may be determined.

Using FIG. 3 as an example, the mobile terminal 10 correspondingly matches the identifier of the wireless local area network 30 and the prestored geographic location of the mobile terminal 10 with the identifier and the geographic location of the wireless local area network storing the corresponding access key in the cloud 20. Assuming herein that the cloud 20 stores the identifiers, geographic locations, and access keys of the wireless local area network 30 and the wireless local area network 40, it can be determined that the wireless local area network 30 is the accessible wireless local area network, and similarly, it can be determined that the wireless local area network 40 is the accessible wireless local area network.

Although the foregoing manner for determining the accessible wireless local area network requires communication with the cloud, the cloud stores identifiers, geographic locations, and access keys of wireless local area networks uploaded by a large number of mobile terminals (such as a mobile terminal in which the WiFi housekeeper is installed), so that when the identifiers and geographic locations of the wireless local area networks covering the mobile terminal are correspondingly matched with the identifiers and geographic locations of wireless local area networks stored in the cloud, it can be ensured that the wireless local area networks covered by the geographic locations of the mobile terminal can be hit.

In another embodiment, giving consideration to both efficiency of searching for the wireless local area network covered by the current geographic location of the mobile terminal and a hit ratio, the identifiers of the wireless local area networks covering the mobile terminal and the prestored geographic location of the mobile terminal are preferentially correspondingly matched with the identifier and the geographic location of the wireless local area network storing the corresponding access key in the mobile terminal, and the accessible wireless local area network that is successfully matched is determined. The process ends if matching succeeds. In some embodiments, when matching on the mobile terminal side fails, the identifiers of the wireless local area networks and the prestored geographic location of the mobile terminal are matched with the identifier and the geographic location of the wireless local area network storing the corresponding access key in the cloud, the accessible wireless local area network that is successfully matched is determined, and the access key, the identifier, and the geographic location of the accessible wireless local area network are stored in the mobile terminal, to update local storage of the mobile terminal. In this way, when the mobile terminal subsequently correspondingly matches the identifier of the same wireless local area network and the prestored geographic location of the mobile terminal with the identifier and the geographic location of the wireless local area network storing the corresponding access key in the mobile terminal, the hit ratio can be improved, so as to improve efficiency of searching for the accessible wireless local area network.

Using FIG. 3 as an example, the mobile terminal 10 correspondingly matches the identifier of the wireless local area network 30 and the prestored geographic location of the mobile terminal 10 with the identifier and the geographic location of the wireless local area network storing the corresponding access key in the mobile terminal 10. Assuming herein that the mobile terminal 10 does not store the identifiers, geographic locations, and access keys of the wireless local area network 30 and the wireless local area network 40, the accessible wireless local area network cannot be hit (that is, cannot be matched). Subsequently, the mobile terminal 10 continues to correspondingly match the identifier of the wireless local area network 30 and the prestored geographic location of the mobile terminal 10 with the identifier and the geographic location of the wireless local area network storing the corresponding access key in the cloud 20. Assuming herein that the cloud 20 stores the identifiers, geographic locations, and access keys of the wireless local area network 30 and the wireless local area network 40, it can be determined that the wireless local area network 30 is the accessible wireless local area network, and similarly, it can be determined that the wireless local area network 40 is the accessible wireless local area network.

The mobile terminal 10 stores the access keys of the wireless local area network 30 and the wireless local area network 40 in the mobile terminal 10 locally, and the accessible wireless local area network may be directly hit when the mobile terminal 10 correspondingly matches the identifier of the wireless local area network 30 and the prestored geographic location of the mobile terminal 10 with the identifier and the geographic location of the wireless local area network storing the corresponding access key in the mobile terminal 10.

It can be learned that when the mobile terminal stores the identifiers, geographic locations, and access keys of the wireless local area networks covering the mobile terminal, the accessible wireless local area network may be directly hit (i.e., the information stored on the mobile terminal matches the accessible wireless local area network), thereby ensuring efficiency of hit of the accessible wireless local area network. When the accessible wireless local area network is not hit, matching is performed in the cloud. Because data of wireless local area networks stored in the cloud is comprehensive, the accessible wireless local area network can be hit.

In an embodiment, for the accessible wireless local area network that is matched in any one of the foregoing manners, that the accessible wireless local area network cannot be used results from various reasons such as low security, frequent update of the access key, and a poor signal. To ensure stability of data communication after access to the accessible wireless local area network, the accessible wireless local area network may also be screened, and an accessible wireless local area network that satisfies a preset condition is screened from the matched accessible wireless local area network. For example, the preset condition includes:

1) A security coefficient is lower than a security coefficient threshold.

2) An access key update frequency exceeds a frequency threshold; frequent update of the access key necessarily causes a network connection to be disconnected after access, affecting continuity of a user using services.

3) Signal strength is lower than a signal strength threshold, indicating that the mobile terminal may be located at an edge of a coverage area of a wireless local area network signal or signal transmission is affected due to shields.

4) The wireless local area network is a private network; on one hand, the private network has a risk of being maliciously caught up, and on the other hand, an owner of the private network may not wish to open the private network to any user.

The matched accessible wireless local area network is replaced with the screened accessible wireless local area network, so as to ensure stability of data communication of access to the accessible wireless local area network.

Step 103: Set a corresponding access key for the accessible wireless local area network on an operating system layer.

Using the WiFi housekeeper run in the mobile terminal as an example, the WiFi housekeeper applies the access key of the accessible wireless local area network to the operating system layer, for the operating system layer to initiate access based on the access key via the network interface 12 of the hardware layer when needing to perform data communication by using the wireless local area network.

Step 104: Present the wireless local area networks covering the mobile terminal on a network connection interface, and present a connection identifier for the accessible wireless local area network.

In an embodiment, information such as SSIDs, whether to encrypt, and signal strength of various types of wireless local area networks covering the mobile terminal is presented on the network connection interface of the mobile terminal. For the accessible wireless local area network, a one-click connection identifier is correspondingly presented, to prompt the user that once the one-click connection identifier is triggered, the user may be accessed to the corresponding wireless local area network. In addition, because the access key of the accessible wireless local area network is obtained, and settings are made on the operating system layer, the user does not need to perform an extra setting operation.

Step 105: Detect an operation on a connection identifier of a target accessible wireless local area network, and perform access based on an access key of the target accessible wireless local area network.

In an embodiment, in continuation of the example in step 104, when the one-click connection identifier is triggered, access is initiated by using the access key of the accessible wireless local area network set on the operating system layer. Using FIG. 3 as an example, when the one-click connection identifier for the wireless local area network 30 is triggered, access is initiated to the wireless local area network 30 by using the access key of the wireless local area network 30, and after access succeeds, data communication is performed via the wireless local area network 30.

As stated above, identifiers, geographic locations, and access keys of some wireless local area networks are stored (for example, a cache) in the mobile terminal. Particularly, the wireless local area network storing the corresponding access key in the mobile terminal corresponds to the current geographic location of the mobile terminal, so as to improve a hit ratio of the mobile terminal in locally matching the accessible wireless local area network. However, with accumulation of time, the wireless local area networks corresponding to the stored access keys may not cover the mobile terminal any longer, and the access key may also get invalid. Therefore, it is necessary to update the stored access keys.

In an embodiment, when detecting that an update condition of the prestored access key of the wireless local area network is satisfied, the mobile terminal updates the prestored access key of the corresponding wireless local area network. For example, access keys of some wireless local area networks are deleted, to avoid setting an invalid access key on the operating system layer, or access keys of some wireless local area networks are synchronized with the cloud, to ensure effectiveness of the access keys.

Descriptions are provided with reference to different examples of the update condition.

In Example 1), the update condition is: an update time of the access key of the wireless local area network is reached.

For example, the update time may be uniformly set for all the wireless local area networks. Once the update time is reached, the access keys are determined to be invalid, and the mobile terminal synchronizes the stored access keys of the wireless local area networks with the cloud, so as to avoid that access cannot be performed after the access keys are set on the operating system layer.

For another example, bonuses of different dimensions are specifically set based on the wireless local area network and include:

1.1) A weight bonus, in positive correlation with stability of the wireless local area network (generally, a more stable wireless local area network indicates smaller possibility of resetting of accessed information; the update time may be relatively prolonged), in negative correlation with security of the wireless local area network (generally, higher security indicates more frequent replacement of access keys; therefore, the update time may need to be relatively shortened), or set according to actual needs;

1.2) A location bonus, which may be in negative correlation with the number of other wireless local area networks deployed at the location of the wireless local area network. For example, if there are relatively many wireless local area networks deployed at the location, the update time may be relatively prolonged based on randomness of user access.

1.3) A merchant identifier bonus. For example, the identifier, such as the SSID, of the wireless local area network has different merchant identifier bonuses because of carrying identifiers of different merchants. For example, a wireless local area network of a large shop is relatively stable and secure, and an update period of an access key is longer. Therefore, a merchant identifier bonus of a large shop may be greater than that of a small shop.

The foregoing bonuses are superposed with a reference update time to obtain the update time of the access key of the corresponding wireless local area network, and the access key of the corresponding wireless local area network is updated when the update time is reached, so as to update an access key according to features of each wireless local area network.

In Example 2), the update condition is: a distance between the geographic location of the wireless local area network and the prestored geographic location of the mobile terminal exceeds a distance threshold.

It indicates that the mobile terminal is beyond the coverage range of the wireless local area network, and it is not necessary to store the corresponding access key in the mobile terminal. Therefore, the access key of the corresponding wireless local area network may be deleted. When the mobile terminal is located within the coverage range of the wireless local area network again, the access key may be synchronized from the cloud to the mobile terminal for local storage.

In addition, the update conditions shown in Example 1) and Example 2) may be combined. For example, the update condition is: an update time of the access key of the wireless local area network is reached; and a distance between the geographic location of the wireless local area network and the prestored geographic location of the mobile terminal exceeds a distance threshold. Once the update time is reached, and the mobile terminal leaves the coverage range of the wireless local area network, the access key of the wireless local area network is determined to be invalid, and it is not necessary to store the corresponding access key in the mobile terminal. Therefore, the access key of the corresponding wireless local area network may be deleted. When the mobile terminal is located within the coverage range of the wireless local area network again, the access key may be synchronized from the cloud to the mobile terminal for local storage.

As stated above, the mobile terminal prestores the geographic location of the mobile terminal. Advantages of the prestored geographic location are: when the accessible wireless local area network needs to be matched, the mobile terminal does not need to be repositioned, but the prestored geographic location (which is regarded as the geographic location closest to the mobile terminal) needs to be read, thereby ensuring efficiency of matching of the accessible wireless local area network. In addition, it is necessary to update the geographic location prestored in the mobile terminal, to ensure accuracy of the prestored geographic location.

It should be noted that the mobile terminal updates the prestored geographic location in this embodiment of the present application in a manner asynchronous with the manner of matching the accessible wireless local area network. On one hand, accuracy of the prestored geographic location is ensured. On the other hand, because asynchronous execution is provided, positioning does not need to be performed when the accessible wireless local area network is matched, thereby improving efficiency of matching of the accessible wireless local area network and avoiding a delay.

In an embodiment, the prestored geographic location is updated in this manner:

positioning the mobile terminal and updating the prestored geographic location of the mobile terminal by using a geographic location obtained through positioning when it is detected that an update condition of the prestored geographic location of the mobile terminal is satisfied. Exemplary descriptions of the update condition are provided below.

In Example 1), it is detected that an update interval time of the geographic location of the mobile terminal is reached.

The geographic location of the mobile terminal is periodically updated by using the update interval time, thereby ensuring timeliness of the geographic location.

2) It is detected that a change of the geographic location of the mobile terminal exceeds a distance threshold.

For example, the mobile terminal stores two (or more) closest geographic locations. A distance between the geographic locations is compared with the distance threshold. If the distance exceeds the distance threshold (greater than an accuracy error of positioning), it indicates that the mobile terminal moves, so as to position the mobile terminal. In this way, when the mobile terminal is static, frequent positioning is not required, avoiding affecting duration performance of the terminal.

3) A particular event of a wireless local area network that is being used by the mobile terminal is detected.

For example, the particular event may be: scanning a list of the wireless local area networks covering the mobile terminal; and disconnection of the wireless local area network.

Once the event of scanning the list of the wireless local area networks covering the mobile terminal or the event of disconnection of the wireless local area network to which the mobile terminal is accessed is detected, the user is accessed to the wireless local area network, or a wireless local area network is reselected for access. Therefore, update of the prestored geographic location can make the accessible wireless local area network that is subsequently matched cover the current geographic location of the mobile terminal.

In addition, the particular event may also be that access of the mobile terminal to the wireless local area network is successfully verified. A heartbeat of a wireless local area network that is set by an application of the mobile terminal to be trustful (being set by an application of the mobile terminal to be trustful means achieving control over the connection to the wireless local area network) is detected.

The foregoing wireless local area network connection is further described below with reference to an example. In the following example, it is assumed that the mobile terminal is an iOS device, and the wireless local area network uses a WiFi protocol network (which is also referred to as a WiFi network).

Figures 1, 4:
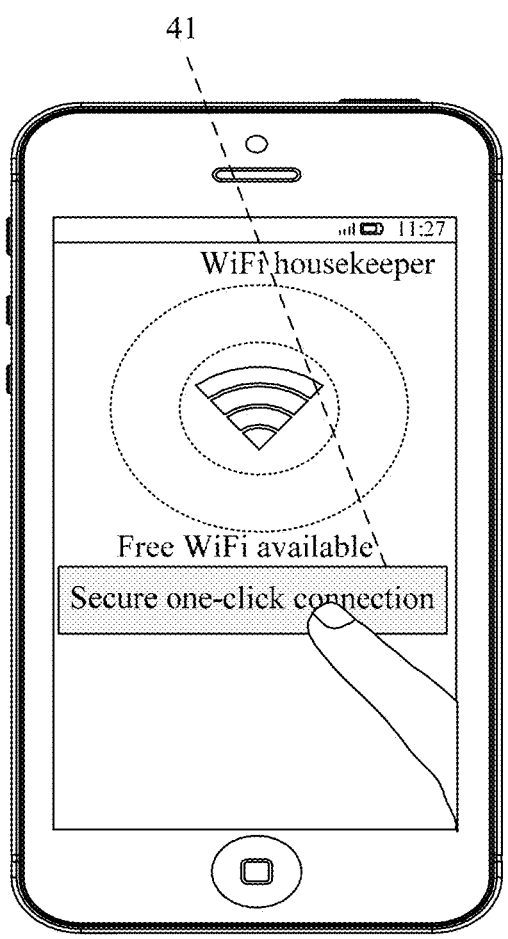
Figures 2, 4:
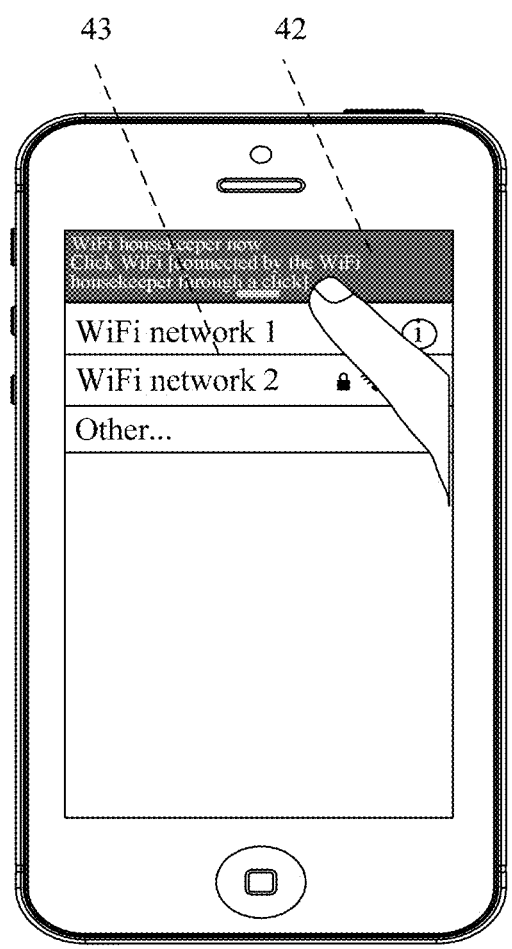
Figures 3, 4:
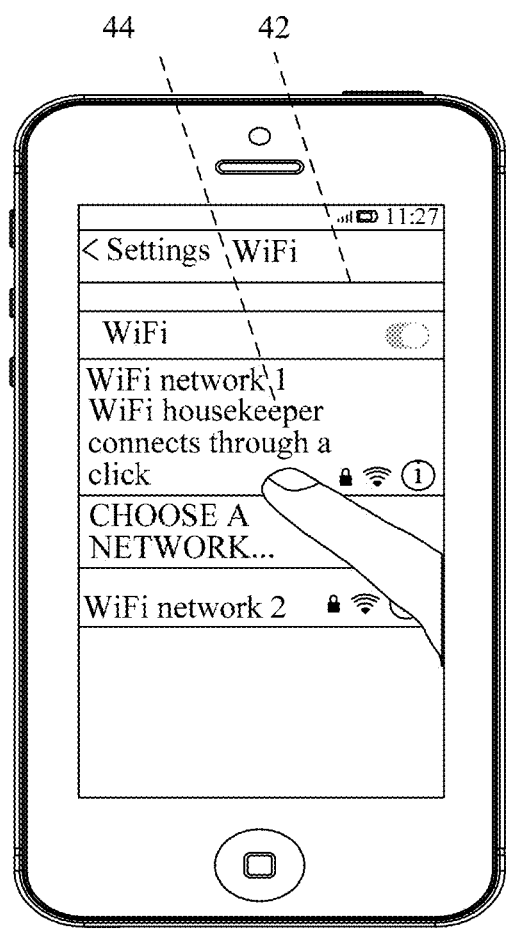

Referring to operation schematic diagrams of a connection to a wireless local area network shown in FIG. 4-1 to FIG. 4-3 in accordance with some embodiments, using the WiFi housekeeper run in the mobile terminal for a WiFi network connection as an example, when a user views a WiFi list, the operating system layer calls back the WiFi list to the WiFi housekeeper, and the WiFi housekeeper obtains and sets access keys of WiFi networks in the WiFi list. Herein, it is assumed that the WiFi list includes a WiFi network 1 and a WiFi network 2, and the WiFi housekeeper obtains an access key of the WiFi network 1.

After the user selects a secure one-click connection 41, the WiFi list is presented on a WiFi list interface 42, and names of the WiFi networks are included. Access keys of the WiFi networks herein are obtained by matching the geographic location of the mobile terminal with SSIDs of the WiFi networks in a cache or cloud of the mobile terminal. When the access keys of the WiFi networks are obtained by matching the geographic location of the mobile terminal with the SSIDs of the WiFi networks, the access keys of the corresponding WiFi networks are matched based on the SSIDs and BSSIDs of the WiFi networks.

The WiFi housekeeper presents on the WiFi list interface 42 a prompt 43 that a one-click connection may be performed by using the WiFi housekeeper. After the user triggers the prompt 43, the WiFi housekeeper presents the one-click connection identifier 44 for an accessible WiFi network on the WiFi list interface 42. After the user triggers the one-click connection identifier 44 set for a WiFi network 1, the WiFi housekeeper triggers the operating system layer to initiate access based on a preset access key of the WiFi network 1.

Figure 5:
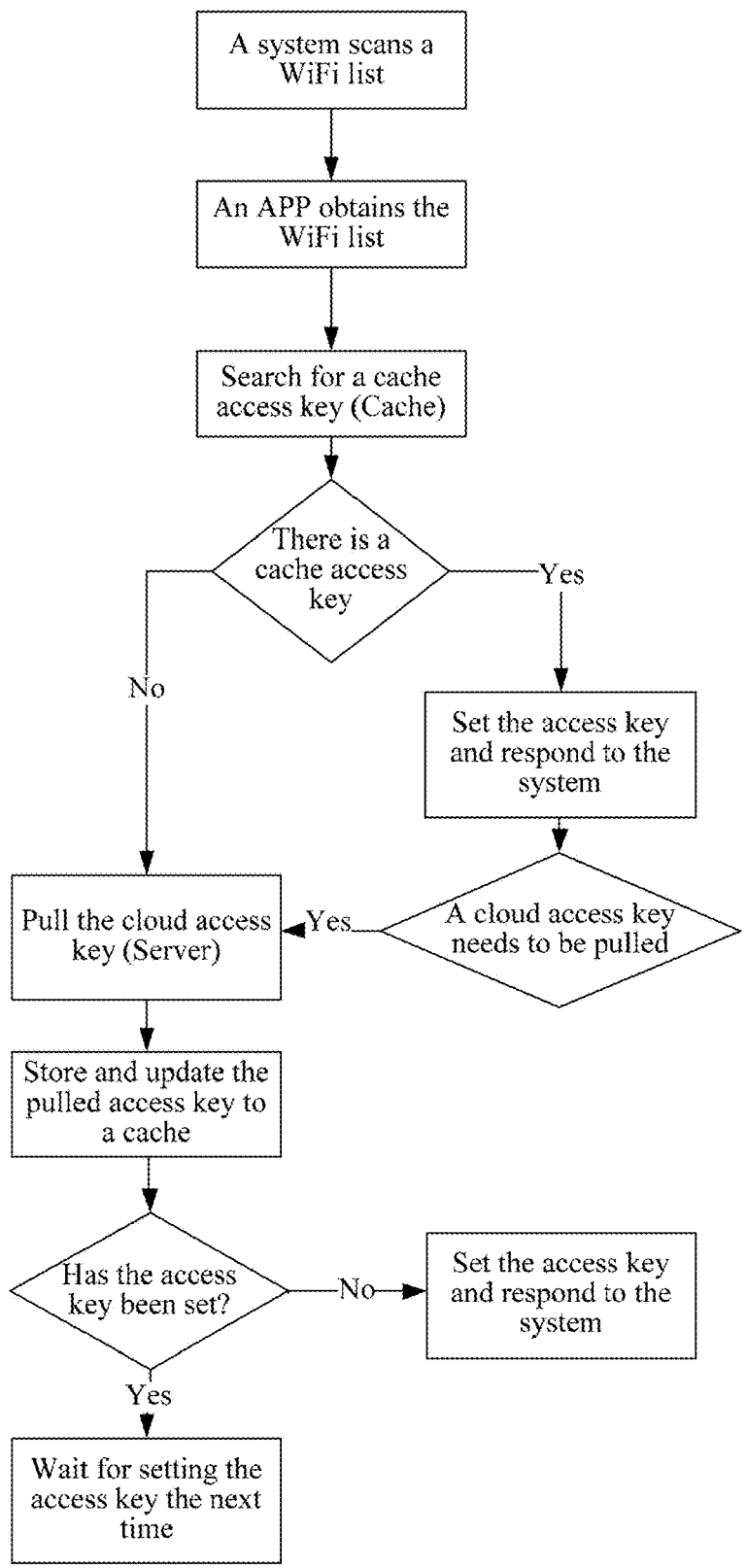
FIG. 5 is a schematic flowchart of setting an access key of a wireless local area network in a mobile terminal, in accordance with some embodiments of the present application.

With reference to a schematic flowchart of setting an access key of a wireless local area network in a mobile terminal shown in FIG. 5, processing of obtaining and setting the access key of the WiFi network shown in FIG. 4-1 to FIG. 4-3 is described in accordance with some embodiments.

The operating system layer of the mobile terminal scans WiFi networks covered by the current location of the mobile terminal according to an inbuilt logic. For example, the WiFi list is scanned when the user triggers the mobile terminal to display the WiFi list interface.

The WiFi housekeeper (Application) obtains the WiFi list scanned by the operating system layer, searches (matches) a cache for access keys of the WiFi network 1 and the WiFi network 2 based on the SSIDs of the WiFi networks in the WiFi list and the current geographic location (equal to geographic locations of the WiFi networks) of the mobile terminal. The cache stores information, such as geographic locations, SSIDs, BSSIDs, update times (the update times may be equal to effective times or may be times before the effective times are reached), and effective times, about some WiFi networks. When the access keys of the WiFi networks are not obtained through matching based on the geographic location of the mobile terminal and the SSIDs of the WiFi networks, the access keys of the corresponding WiFi networks may also be matched based on the SSIDs and BSSIDs of the WiFi networks.

If the access keys of the WiFi networks are found in the cache, and the access keys do not get invalid, the access keys of the WiFi networks are not set to the operating system layer, and that the access keys of the WiFi networks are already set is replied to the operating system layer. The operating system layer calls back the WiFi list to the WiFi housekeeper while scanning the WiFi list, so that the WiFi housekeeper can set passwords of the WiFi networks.

Herein, assuming that the access key of the WiFi network 1 is found in the cache, but the access key of the WiFi network 2 is not found, the access key of the WiFi network 2 continues to be pulled to the cloud based on the SSID and the geographic location of the WiFi network 2, and the cache of the mobile terminal stores information, such as the access key, the time, and the geographic location, about the WiFi network 2.

In addition, for the WiFi network 1, even if the corresponding access key is found in the cache of the mobile terminal, if the update time or effective time of the access key is reached, the access key of the WiFi network 1 is still pulled from the cloud, and cached information, such as the access key and the effective time, about the WiFi network 1 in the mobile terminal is updated.

If the operating system layer does not make, by means of callback, the WiFi housekeeper set the access keys of the WiFi networks, the WiFi housekeeper may set the access key of the WiFi network 1 by means of callback of the operating system layer. If the operating system layer already makes, by means of callback, the WiFi housekeeper set the access keys of the WiFi networks, the WiFi housekeeper needs to wait to set the access keys when the operating system layer scans the WiFi list the next time and calls back the WiFi list to the WiFi housekeeper.

An example in relation to the flowchart of FIG. 5 is as follows: User A uses the WiFi at the airport lounge whenever he travels. His mobile terminal stores information about the WiFi network, including an identifier (e.g., "AirportLounge"), geographical location and access key. When User A is at the airport lounge and views a list of available WiFi networks on his mobile terminal, the operating system layer calls back the WiFi list to the WiFi housekeeper application running on his mobile terminal. The WiFi housekeeper searches (matches) a cache for access key of the AirportLounge network and the WiFi housekeeper obtains and sets the corresponding access key of AirportLounge WiFi network in the WiFi list. The WiFi housekeeper presents on the WiFi list interface a prompt that a one-click connection may be performed by using the WiFi housekeeper. After the user triggers the prompt, the WiFi housekeeper presents the one-click connection identifier for an accessible WiFi network on the WiFi list interface. After the user triggers the one-click connection identifier set for the "AirportLounge" WiFi network, the WiFi housekeeper triggers the operating system layer to initiate access based on a preset access key of the "AirportLounge" WiFi network.

Following on from the example, suppose that the access key (i.e., password) for the "AirportLounge" WiFi network has been updated after User A's visit. The updated password may be posted on the cloud securely and is accessible to subscribers of the WiFi housekeeper application. Thus, during his next visit, even though the old access key (i.e., the previous access key which is no longer valid) is found in the cache of the mobile terminal, the WiFi housekeeper application detects that the effective time of the access key is reached and no longer valid, and thus the WiFi housekeeper application retrieves from the cloud the new access key of the AirportLounge WiFi network. In some embodiments, the WiFi housekeeper application also updates the cached information (e.g., the new access key/password and the effective time of update) on User A's mobile terminal.

In some embodiments, the steps illustrated in the flowchart of FIG. 5 are performed with the mobile terminal connected to a network distinct from the WiFi networks that the mobile terminal is trying to obtain access to (e.g., a cellular network). In some embodiments, the mobile terminal automatically launches the WiFi housekeeper application upon detection of wireless networks, and automatically switches its connection network (e.g., from cellular to WiFi) upon the successful connection to an accessible wireless local area network.

Thus, the disclosed processes enable a user to connect easily and seamlessly to an accessible wireless local area network, thus eliminating the hassle of figuring out the validity of previously used access keys. Furthermore, the automatic detection of, and connection to, wireless networks reduces the use of cellular data, leading to cost savings for the user.

Figure 6:
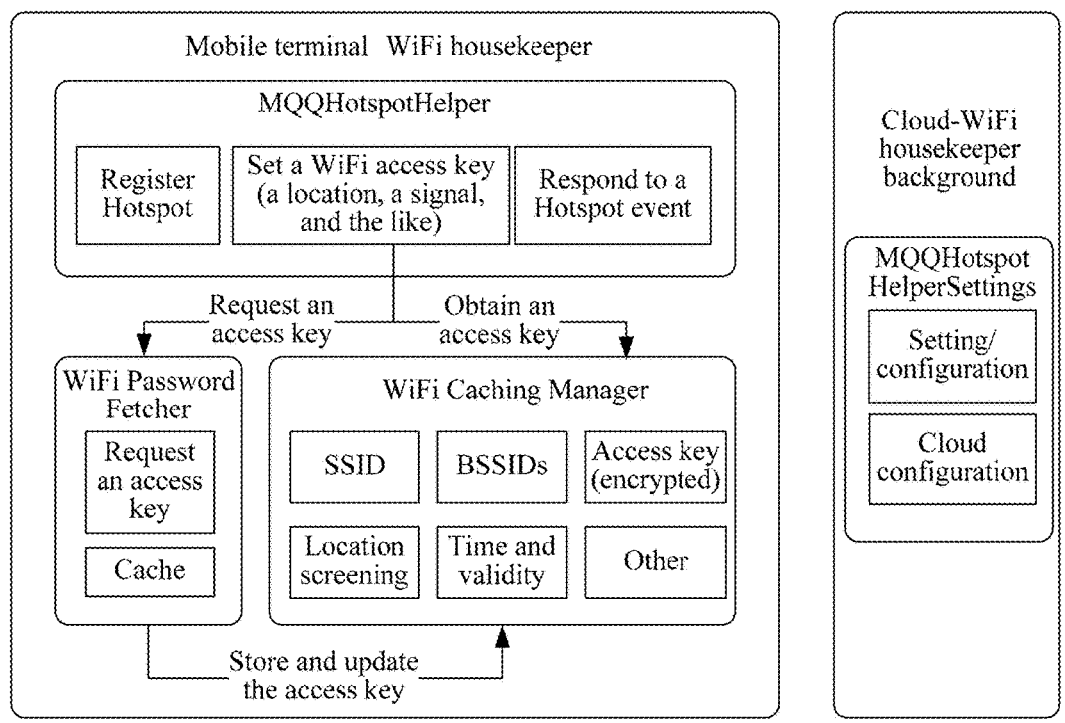
FIG. 6 is an architecture schematic diagram of connecting a mobile terminal to a WiFi network, in accordance with some embodiments of the present application.

With reference to an architecture schematic diagram of connecting a mobile terminal to a WiFi network shown in FIG. 6, processing of connecting the WiFi housekeeper to the WiFi networks is described in accordance with some embodiments.

In FIG. 6, connection to the WiFi networks is implemented by components that the mobile terminal and the cloud together run.

The following components are run in the mobile terminal:

MQQHotspotHelper component (which may be implemented as a functional component of the WiFi housekeeper), which is responsible for an event of registering hotspots, responds to an event of the hotspots, and sets the access keys of the WiFi networks in a ScanList event.

WiFi Password Fetcher (which may implemented as a functional component of the WiFi housekeeper), which is responsible for searching the cache for the access keys of the WiFi networks in the WiFi list, sets the access keys of the WiFi networks in the ScanList event when WiFi access keys are found, and pulls the access keys of the WiFi networks from the cloud, for example, pulls the access keys of the WiFi networks in the WiFi list form the cloud, if the access keys of the WiFi networks in the WiFi list are not found in the cache. Pulling is performed according to geographic locations, SSIDs, and the like of the WiFi networks in the WiFi list, and after the access keys are successfully pulled, the access keys of the WiFi networks are cached.

WiFi Password Caching Manager, which is responsible for managing the cache of the WiFi access key and caches and manages related information, such as SSIDs, BSSIDs, access keys, geographic locations, update times, and effective times, about the WiFi networks.

For example, when the cached update times of the access keys are reached, a new access key of a corresponding WiFi network is pulled from the cloud by using WiFi Password Fetcher, and the new access key of the WiFi network is updated to the cache.

For another example, when the cached effective times of the access keys are reached, a new access key of a corresponding WiFi network is pulled from the cloud by using WiFi Password Fetcher, and the new access key of the WiFi network is updated to the cache.

In some embodiments, the WiFi Housekeeper application maintains a contact list of other users (e.g., family members and/or travel companions of the user) associated with the user of the mobile terminal, who will also obtain the new access key of the WiFi network and gain access to the accessible wireless local area network. In some embodiments, the contact list is maintained on a separate application on the mobile terminal and the WiFi Housekeeper application is configured to access the contact list on the separate application.

In accordance with some embodiments and referring back to the example of FIG. 5, suppose that User A maintains a contact list of his travel companion (e.g., his family members) on his mobile terminal, each companion having his/her own mobile device(s). Accordingly, after the WiFi housekeeper application on User A's mobile terminal retrieves from the cloud the new access key of the AirportLounge WiFi network, information about the new access key is generated and sent (e.g., using an instant messaging application) to the contact list of User A, so that each of the members on the list can each in turn obtain access to the accessible wireless local area network.

For another example, when a distance between the cached geographic locations corresponding to the access keys and the current geographic location of the mobile terminal exceeds the distance threshold, information about the corresponding WiFi network is deleted from the cache.

The following components are run in the cloud:

MQQHotspotHelperSettings (which may be implemented as a component of a WiFi housekeeper background), which is responsible for carrying configuration items of entire HotspotHelper and is capable of dynamic configuration at the cloud.

For example, the following types of parameters may be configured at the cloud:

1) A WiFi successful connection check parameter, such as a timeout value and a check interval. After the mobile terminal initiates a timeout value that a connection exceeds, if the connection does not succeed, the connection fails. After the connection succeeds, whether a connection to the WiFi network is maintained is examined based on a check interval time.

2) A WiFi one-click connection setting parameter, such as a signal strength threshold and the maximum number of WiFi networks that can be connected through one click and that is set by each list. The signal strength threshold is used for controlling a WiFi network displaying the one-click connection identifier. When signal strength of the WiFi network is lower than the signal strength threshold, even if the access key of the WiFi network is provided, the one-click connection identifier of WiFi is not correspondingly displayed.

3) A geographic location parameter, such as an update interval, update accuracy, and an update moment.

The update interval is used for controlling update of the cached geographic location of the mobile terminal. When the update interval is reached, the mobile terminal is repositioned, and the location of the mobile terminal is updated in the cache, thereby ensuring timeliness of the cached geographic location of the mobile terminal.

The update accuracy is used for controlling a movement distance triggering updating the geographic location of the mobile terminal. For example, the cache stores two closest geographic locations of the mobile terminal. When it is determined based on the two geographic locations that the movement distance of the mobile terminal exceeds the update accuracy, the mobile terminal is positioned, and the cached geographic location of the mobile terminal is updated.

The update moment is used for indicating a particular event triggering updating the geographic location of the mobile terminal. The event is, for example, scanning of the WiFi list; the WiFi network being successfully connected; the WiFi network being successfully verified; a heartbeat of a trusted WiFi network; and disconnection from the WiFi network.

4) A WiFi access key cache parameter, such as a basic time, a weight bonus, a location bonus, and a merchant identifier bonus, and a distance threshold between the current geographic location and the cached geographic location of WiFi, where basic information marked by a merchant includes a shop name, a category, a telephone, an address, and the like.

The WiFi access key cache parameter is used for indicating a moment for updating the cached access key of the WiFi network. For example, when the update time is reached, the access key in the cache is updated. When a distance between the current geographic location (read from the cache) of the mobile terminal and the geographic location of the WiFi network exceeds the distance threshold, information, such as an SSID, an access key, and a geographic location, about the corresponding WiFi network is deleted from the cache.

5) A one-click connection capability in a WiFi trusted mode may set trust of a WiFi network, and one and only one application can control a connection to a WiFi network. After the application gains a control right of a connection to a WiFi network by setting the trust, when the mobile terminal is accessed to the WiFi network, the application receives callback of the operating system layer at regular intervals, and the application is activated, so as to control a state of connection to the WiFi network.

After setting the trust for a WiFi network, the application has a capability of controlling a previous connection to the WiFi network, for example:

After successfully connecting to the WiFi network set to be trusted, the operating system layer calls back the application every five minutes. The application has a capability of executing code in a background, for example, checks security of the WiFi network, obtains a geographic location of the WiFi network (improving a connection success rate), and performs other services requiring a background capability (such as real-time reporting of statistical points, traffic monitoring, and electric quantity checking).

A connection to a WiFi network set to be trusted is disconnected when a manual operation is not needed. For example, when a WiFi network is checked to have a security problem, a user may be prompted, and the connection to the WiFi network is actively disconnected for the user.

After the connection to the WiFi network succeeds, an identifier added by a current application for the WiFi network may be displayed. When multiple applications having one-click connection simultaneously attach a one-click connection identifier to the same WiFi network, when the WiFi network is not connected, the operating system layer displays identifiers of multiple applications in a manner of corresponding to the WiFi networks in the WiFi list. However, after the WiFi network is successfully connected, the operating system layer displays an identifier of only one application that is trusted. This helps brands be exposed.

6) A character string for attaching an identifier is used for controlling content of characters in the connection identifier.

7) A cloud configuration update check parameter, used for supporting update of the foregoing various parameters.

Figure 7:
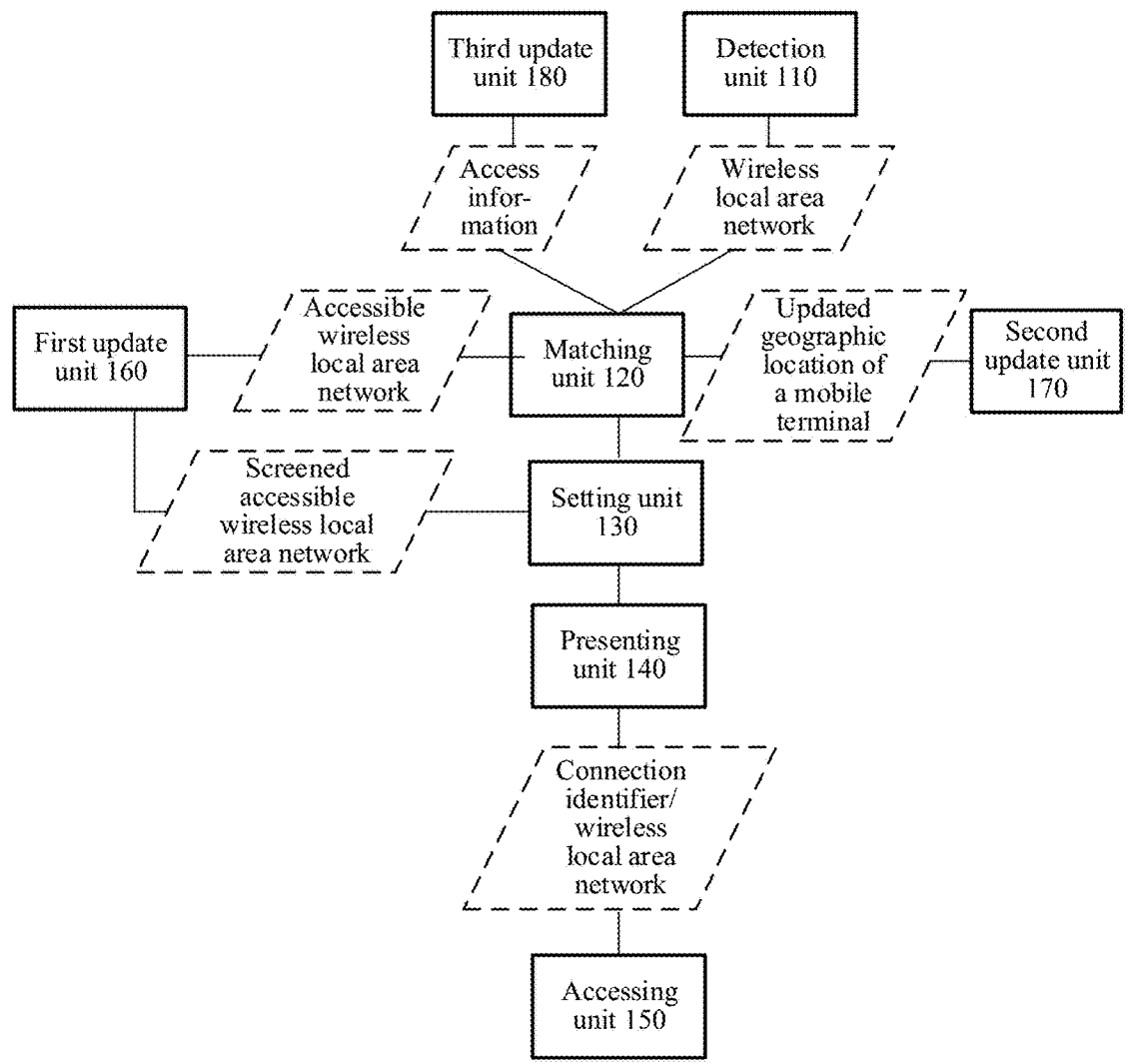
FIG. 7 is a functional structure schematic diagram of a mobile terminal, in accordance with some embodiments of the present application.

Exemplary descriptions of a logic structure of the foregoing mobile terminal are provided. Refer to a logic structure schematic diagram of a mobile terminal shown in FIG. 7. It should be noted that logic functional units in FIG. 7 may be further divided or combined. Therefore, the logic functional structure of the mobile terminal is not limited to a form shown in FIG. 7. In FIG. 7, the mobile terminal includes: a detection unit 110, a matching unit 120, a setting unit 130, a presenting unit 140, an accessing unit 150, a first update unit 160, and a second update unit 170.

The units are described below.

The detection unit 110 is configured to detect wireless local area networks covering a mobile terminal. In some embodiments, each of the wireless local area networks includes an identifier, which the detection unit 110 is also configured to detect.

For example, the detection unit 110 detects a broadcasting signal of a wireless local area network in an environment in which the mobile terminal is located and parses the broadcasting signal to obtain an identifier of the corresponding wireless local area network.

For another example, the detection unit 110 prestores a geographic location of the mobile terminal and updates the geographic location when an update condition of the geographic location is satisfied, to ensure timeliness of the stored geographic location. In addition, the mobile terminal further stores an identifier and a geographic location of a wireless local area network (such as the foregoing hidden wireless local area network) having an access key. Thus, the detection unit 110 matches the prestored (for example, stored in a cache) geographic location of the mobile terminal with the geographic location of the wireless local area network storing the corresponding access key, and if matching succeeds, determines that the mobile terminal is within a coverage range of a corresponding wireless local area network.

The matching unit 120 is configured to: match identifiers of the wireless local area networks and a current geographic location of the mobile terminal with an identifier and a geographic location of a wireless local area network storing a network access key, and determine an accessible wireless local area network in the wireless local area networks covering the mobile terminal, the accessible wireless local area network having a corresponding access key.

In an embodiment, the matching unit 120 is further configured to: correspondingly match the identifiers of the wireless local area networks and the prestored geographic location of the mobile terminal with the identifier and the geographic location of the wireless local area network storing the corresponding access key in the mobile terminal, and determine the accessible wireless local area network that is successfully matched.

The mobile terminal prestores the geographic location and the identifier of the wireless local area network having the corresponding access key, and therefore, when the mobile terminal is within a coverage range of any wireless local area network, the accessible wireless network at the current geographic location and the corresponding access key may be efficiently found.

In an embodiment, the matching unit 120 is further configured to: when matching fails, match the identifiers of the wireless local area networks and the prestored geographic location of the mobile terminal with an identifier and a geographic location of a wireless local area network storing a corresponding access key in a cloud, determine the accessible wireless local area network that is successfully matched, and store the access key of the accessible wireless local area network into the mobile terminal.

When the mobile terminal stores the identifiers, geographic locations, and access keys of the wireless local area networks covering the mobile terminal, the accessible wireless local area network may be directly hit, thereby ensuring efficiency of hit of the accessible wireless local area network. When the accessible wireless local area network is not hit, matching is performed in the cloud. Because data of wireless local area networks stored in the cloud is comprehensive, the accessible wireless local area network can be hit.

In an embodiment, the matching unit 120 is further configured to: match the identifiers of the wireless local area networks and the prestored geographic location of the mobile terminal with an identifier and a geographic location of a wireless local area network storing a corresponding access key in a cloud, and determine an accessible wireless local area network that is successfully matched.

Although the foregoing manner for determining the accessible wireless local area network requires communication with the cloud, the cloud stores identifiers, geographic locations, and access keys of wireless local area networks uploaded by a large number of mobile terminals (such as a mobile terminal in which the WiFi housekeeper is installed), so that when the identifiers and geographic locations of the wireless local area networks covering the mobile terminal are correspondingly matched with the identifiers and geographic locations of wireless local area networks stored in the cloud, it can be ensured that the wireless local area networks covered by the geographic locations of the mobile terminal can be hit.

In an embodiment, the mobile terminal further includes: the first update unit 160, configured to screen from the accessible wireless local area network an accessible wireless local area network that satisfies a preset condition and update, by using the screened accessible wireless local area network, the accessible wireless local area network that is successfully matched, where the preset condition includes one of the following:

a security coefficient is lower than a security coefficient threshold;

an update frequency of an access key exceeds a frequency threshold;

signal strength is lower than a signal strength threshold; and the wireless local area network is a private network.

The setting unit 130 is configured to set a corresponding access key for the accessible wireless local area network on an operating system layer.

The presenting unit 140 is configured to: present the wireless local area networks covering the mobile terminal on a network connection interface, and present a connection identifier for the accessible wireless local area network.

The accessing unit 150 is configured to: detect an operation on a connection identifier of a target accessible wireless local area network, and perform access based on an access key of the target accessible wireless local area network.

In an embodiment, the mobile terminal further includes: the second update unit 170, configured to position the mobile terminal and update the prestored geographic location of the mobile terminal by using a geographic location obtained through positioning when it is detected that an update condition of the prestored geographic location of the mobile terminal is satisfied.

It is detected that an update interval time of the geographic location of the mobile terminal is reached.

It is detected that a change of the geographic location of the mobile terminal exceeds a distance threshold.

The wireless local area network storing the corresponding access key in the mobile terminal corresponds to the current geographic location of the mobile terminal, so as to improve a hit ratio of the mobile terminal in locally matching the accessible wireless local area network.

In an embodiment, the mobile terminal further includes: a third update unit 180, configured to: update the prestored access key of the corresponding wireless local area network when it is detected that an update condition of the prestored access key of the wireless local area network is satisfied, where the update condition includes at least one of the following an update time of the access key of the wireless local area network is reached; and a distance between the geographic location of the wireless local area network and the prestored geographic location of the mobile terminal exceeds a distance threshold, where the update time may be determined in this manner: superposing a bonus of at least one dimension of the wireless local area network and a reference update time to obtain the update time of the access key of the wireless local area network, where the bonus includes: a weight bonus, a location bonus, and a merchant identifier bonus.

The mobile terminal updates the prestored access key of the corresponding wireless local area network when detecting that an update condition of the prestored access key of the wireless local area network is satisfied, thereby maintaining effectiveness of the access key stored in the mobile terminal.

In conclusion, the embodiments of the present application have the following beneficial effects:

1. The one-click connection identifier supports a user to connect to the wireless local area networks through a click and does not require an extra operation, thereby improving efficiency of access to the wireless local area network.

2. When the wireless local area networks covering the mobile terminal are handed over, the mobile terminal can be accessed as long as a new wireless local area network is connected by using the one-click connection identifier, thereby implementing seamless handover of access.

3. The access key of the wireless local area network is delivered through the cloud, update of the access key and the geographic location of the mobile terminal may be controlled by using various parameters configured by the cloud, and the access key stored in the mobile terminal is dynamically updated according to the geographic location of the mobile terminal.

4. The mobile terminal stores the access key of the wireless local area network by locally using a cache mechanism, thereby avoiding frequent pulling of the access key from the cloud, so as to reduce network traffic, accelerate efficiency of access to the wireless local area network, and improve a success rate of access.

A person skilled in the art may understand that all or some of the steps of the foregoing method embodiments may be implemented by using hardware relevant to an application instruction. The application may be stored in a non-transitory computer readable storage medium. When being executed, the application performs steps of the foregoing method embodiments. The storage medium includes: various media capable of storing application code such as a mobile storage mobile terminal, a random access memory (RAM, Random Access Memory), a read-only memory (ROM, Read-Only Memory), a magnetic disk, or an optical disc.

Figure 8:
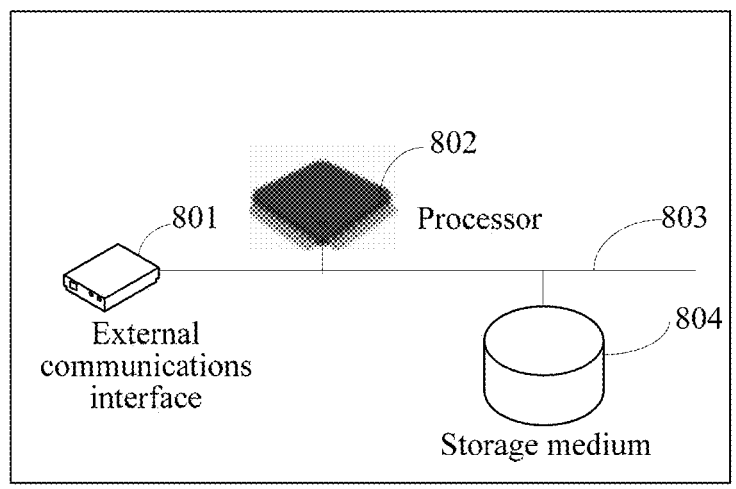
FIG. 8 is a hardware structure schematic diagram of a mobile terminal, in accordance with some embodiments of the present application.

Specifically, as shown in FIG. 8, a hardware implementation of the mobile terminal in the present application includes a processor 802, a non-transitory computer readable storage medium 804, and at least one external communications interface 801. The processor 802, the storage medium 804, and the external communications interface 801 are all connected by using a bus 803. The processor 802 may be an electronic component having a processing function, for example, a microcontroller unit, a central processing unit, a digital signal processor, or a programmable logic array. The storage medium 804 stores computer executable code.

The storage medium 804 includes or stores at least one group of instructions. When the instructions are executed, the processor 802 is caused to perform the foregoing wireless local area network connection method in the present application. The following method is included but is not limited to be performed:

detecting wireless local area networks covering a mobile terminal;

correspondingly matching identifiers of the wireless local area networks and a current geographic location of the mobile terminal with an identifier and a geographic location of a wireless local area network storing a corresponding access key, and determining an accessible wireless local area network having a corresponding access key in the wireless local area networks covering the mobile terminal;

setting a corresponding access key for the accessible wireless local area network on an operating system layer;

presenting a list of the wireless local area networks covering the mobile terminal on a network connection interface, and presenting a connection identifier for the accessible wireless local area network; and performing access based on the set access key of the accessible wireless local area network in response to an operation on the connection identifier.

It should be noted that the storage medium in the present application can also execute processing in the foregoing method processes. This is not described in detail herein.

Alternatively, if the foregoing integrated units of the present application are implemented in a form of software functional modules and are sold or used as independent products, the units may be stored in a computer readable storage medium. Based on such understanding, the technical solutions of the embodiments of the present application essentially or the part contributing to the related technology may be implemented in a form of a software product. The computer software product is stored in a storage medium and includes several instructions for instructing a computer mobile terminal (which may be a personal computer, a server, a network mobile terminal, or the like) to perform all or some of the methods in the embodiments of the present disclosure. The foregoing storage medium includes: any media that can store application code, such as a mobile storage mobile terminal, a RAM, a ROM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application should be subject to the protection scope of the claims.

What is claimed is:

1. A method of connecting to a wireless local area network performed at a mobile terminal, the method comprising:
   detecting, by the mobile terminal, wireless local area networks covering the mobile terminal, wherein each of the wireless local area networks includes an identifier;
   correspondingly matching, by the mobile terminal, the identifiers of the wireless local area networks and a current geographic location of the mobile terminal with an identifier and a geographic location of a wireless local area network storing a network access key;
   when the matching succeeds, determining, by the mobile terminal, an accessible wireless local area network in the wireless local area networks covering the mobile terminal that is successfully matched, the accessible wireless local area network having a corresponding access key;
   when the matching fails, correspondingly matching, by the mobile terminal, the identifiers of the wireless local area networks and the current geographic location of the mobile terminal with an identifier and a geographic location of a wireless local area network storing a network access key in a cloud;
   determining the accessible wireless local area network that is successfully matched;
   storing the network access key of the accessible wireless local area network into the mobile terminal;
   setting, by the mobile terminal, the corresponding access key for the accessible wireless local area network on the mobile terminal;
   presenting, by the mobile terminal in an application, a list of the wireless local area networks covering the mobile terminal on a network connection interface, and presenting a connection identifier for the accessible wireless local area network; and
   detecting, by the mobile terminal, an operation on the connection identifier of the accessible wireless local area network, and connecting to the accessible wireless local area network based on the access key of the accessible wireless local area network.

2. The method according to claim 1, wherein correspondingly matching the identifiers of the wireless local area networks and the prestored geographic location of the mobile terminal with the identifier and the geographic location of the wireless local area network storing the network access key, and determining the accessible wireless local area network in the wireless local area networks covering the mobile terminal, the accessible wireless local area network having a corresponding access key comprises:
   matching the identifiers of the wireless local area networks and the prestored geographic location of the mobile terminal with an identifier and a geographic location of a wireless local area network storing a corresponding access key in a cloud; and
   determining the accessible wireless local area network that is successfully matched.

3. The method according to claim 1, wherein the accessible wireless local area network is a first one of a plurality of accessible wireless local area networks, the method further comprising:
   screening and identifying from the plurality of accessible wireless local area networks a second accessible wireless local area network that satisfies a preset condition; and
   updating the second accessible wireless local area network as the accessible wireless local area network, wherein the preset condition comprises at least one of the following:
      a security coefficient is lower than a security coefficient threshold;
      an update frequency of an access key exceeds a frequency threshold;
      signal strength is lower than a signal strength threshold; and
      the wireless local area network is a private network.

4. The method according to claim 1, further comprising:
   positioning the mobile terminal; and
   updating the prestored geographic location of the mobile terminal by using a geographic location obtained through the positioning when an update condition of the prestored geographic location of the mobile terminal is satisfied, wherein the update condition comprises at least one of the following:
      an update interval time of the geographic location of the mobile terminal is reached;
      a change of the geographic location of the mobile terminal exceeds a distance threshold; and
      a particular event of a wireless local area network that is being used by the mobile terminal is detected.

5. The method according to claim 1, further comprising:
   updating the prestored access key of the corresponding wireless local area network when an update condition of the prestored access key of the wireless local area network is satisfied, wherein the update condition comprises at least one of the following:
      an update time of the access key of the wireless local area network is reached; and
      a distance between the geographic location of the wireless local area network and the prestored geographic location of the mobile terminal exceeds a distance threshold.

6. The method according to claim 5, further comprising:
   superposing a bonus of at least one dimension of the wireless local area network and a reference update time to obtain the update time of the access key of the wireless local area network, wherein the bonus comprises: a weight bonus, a location bonus, and a merchant identifier bonus.

7. A mobile terminal for connecting to a wireless local area network, the mobile terminal comprising:
   one or more processors;
   memory; and
   a plurality of program modules stored in the memory and configured for execution by the one or more processors, wherein the plurality of program modules, when executed by the one or more processors, cause the mobile terminals to perform a plurality of operations including:

detecting, by the mobile terminal, wireless local area networks covering the mobile terminal, wherein each of the wireless local area networks includes an identifier;

correspondingly matching, by the mobile terminal, the identifiers of the wireless local area networks and a current geographic location of the mobile terminal with an identifier and a geographic location of a wireless local area network storing a network access key;

when the matching succeeds, determining, by the mobile terminal, an accessible wireless local area network in the wireless local area networks covering the mobile terminal that is successfully matched, the accessible wireless local area network having a corresponding access key;

when the matching fails, correspondingly matching, by the mobile terminal, the identifiers of the wireless local area networks and the current geographic location of the mobile terminal with an identifier and a geographic location of a wireless local area network storing a network access key in a cloud;

determining the accessible wireless local area network that is successfully matched;

storing the network access key of the accessible wireless local area network into the mobile terminal;

setting, by the mobile terminal, the corresponding access key for the accessible wireless local area network on the mobile terminal;

presenting, by the mobile terminal in an application, a list of the wireless local area networks covering the mobile terminal on a network connection interface, and presenting a connection identifier for the accessible wireless local area network; and detecting, by the mobile terminal, an operation on the connection identifier of the accessible wireless local area network, and connecting to the accessible wireless local area network based on the access key of the accessible wireless local area network.

8. The mobile terminal according to claim 7, wherein the plurality of operations further comprise:

screening and identifying from the plurality of accessible wireless local area networks a second accessible wireless local area network that satisfies a preset condition; and updating the second accessible wireless local area network as the accessible wireless local area network, wherein the preset condition comprises at least one of the following:

a security coefficient is lower than a security coefficient threshold;

an update frequency of an access key exceeds a frequency threshold;

signal strength is lower than a signal strength threshold; and the wireless local area network is a private network.

9. The mobile terminal according to claim 7, wherein the plurality of operations further comprise:

positioning the mobile terminal; and updating the prestored geographic location of the mobile terminal by using a geographic location obtained through the positioning when an update condition of the prestored geographic location of the mobile terminal is satisfied, wherein the update condition comprises at least one of the following:

an update interval time of the geographic location of the mobile terminal is reached;

a change of the geographic location of the mobile terminal exceeds a distance threshold; and a particular event of a wireless local area network that is being used by the mobile terminal is detected.

10. The mobile terminal according to claim 7, wherein the plurality of operations further comprise:

updating the prestored access key of the corresponding wireless local area network when an update condition of the prestored access key of the wireless local area network is satisfied, wherein the update condition comprises at least one of the following:

an update time of the access key of the wireless local area network is reached; and a distance between the geographic location of the wireless local area network and the prestored geographic location of the mobile terminal exceeds a distance threshold.

11. The mobile terminal according to claim 10, wherein the plurality of operations further comprise:

superposing a bonus of at least one dimension of the wireless local area network and a reference update time to obtain the update time of the access key of the wireless local area network, wherein the bonus comprises: a weight bonus, a location bonus, and a merchant identifier bonus.

12. A non-transitory computer readable storage medium storing a plurality of computer executable instructions, including instructions for connecting to a wireless local area network, which when executed by a mobile terminal having memory and one or more processors, cause the mobile terminal to:

detect wireless local area networks covering a mobile terminal, wherein each of the wireless local area networks includes an identifier;

correspondingly match the identifiers of the wireless local area networks and a current geographic location of the mobile terminal with an identifier and a geographic location of a wireless local area network storing a network access key, and when the matching succeeds, determine an accessible wireless local area network in the wireless local area networks covering the mobile terminal, the accessible wireless local area network having a corresponding access key, when the matching fails, correspondingly match the identifiers of the wireless local area networks and the current geographic location of the mobile terminal with an identifier and a geographic location of a wireless local area network storing a network access key in a cloud, determine the accessible wireless local area network that is successfully matched, and store the network access key of the accessible wireless local area network into the mobile terminal;

set the corresponding access key for the accessible wireless local area network on the mobile terminal;

present, in an application, a list of the wireless local area networks covering the mobile terminal on a network connection interface, and present a connection identifier for the accessible wireless local area network; and detect an operation on the connection identifier of the accessible wireless local area network, and connect to the accessible wireless local area network based on the access key of the accessible wireless local area network.

13. The non-transitory computer readable storage medium according to claim 12, wherein the instructions to correspondingly match the identifiers of the wireless local area networks and the prestored geographic location of the mobile terminal with the identifier and the geographic location of the wireless local area network storing the network access key, and determine the accessible wireless local area network in the wireless local area networks covering the mobile terminal, the accessible wireless local area network having a corresponding access key further comprise instructions to:
- match the identifiers of the wireless local area networks and the prestored geographic location of the mobile terminal with an identifier and a geographic location of a wireless local area network storing a corresponding access key in a cloud; and
- determine the accessible wireless local area network that is successfully matched.

14. The non-transitory computer readable storage medium according to claim 12, further comprising instructions to:
- position the mobile terminal; and
- update the prestored geographic location of the mobile terminal by using a geographic location obtained through the positioning when an update condition of the prestored geographic location of the mobile terminal is satisfied, wherein the update condition comprises at least one of the following:
  - an update interval time of the geographic location of the mobile terminal is reached;
  - a change of the geographic location of the mobile terminal exceeds a distance threshold; and
  - a particular event of a wireless local area network that is being used by the mobile terminal is detected.

* * * * *